UNITED STATES PATENT OFFICE.

JAMES C. CHEATHAM, OF DECATUR, ILLINOIS.

IMPROVEMENT IN ROOFING COMPOSITIONS.

Specification forming part of Letters Patent No. 187,748, dated February 27, 1877; application filed March 20, 1876.

*To all whom it may concern:*

Be it known that I, JAMES C. CHEATHAM, of Decatur, in the county of Macon and State of Illinois, have invented an Improved Method of Construction and Composition for Roof-Covering; and I do hereby declare that the following is a full and exact description thereof.

The ingredients of this composition are as follows, and in the proportions given, or thereabout: Coal-tar, fifty gallons; lime, unslaked, ten pounds; sulphur, four pounds; water, eight gallons.

In preparing this composition, first, the sulphur and lime are put into the water, which is boiled until the mass has about the consistency of ordinary soft soap. It is then mixed with the coal-oil, and the mixture is boiled until it has a sirupy consistency.

With this composition the roof-covering is constructed as follows: First, any suitable and practically available cloth, preferably cotton-cloth, such as cotton-drilling, is stretched and secured upon the surface of the roof. The composition is then spread upon the surface of the cloth with a brush as thickly as it will adhere to the cloth without flowing. Then grated gravel, say, of a size about equal to grains of wheat, or sand, is sifted or otherwise spread upon the surface of the composition, and then well rolled down thereon. After this covering has stood a few days to harden, all the loose gravel or sand is swept off, and the surface is again rolled.

What I claim as my invention, and desire to secure by Letters Patent, is—

A roof-covering formed and composed of cloth stretched upon the roof, the said cloth being covered with a layer composed of coal-tar, unslaked lime, sulphur, and water, in the proportions herein described, and upon that layer a coating of fine gravel or coarse sand, pressed into the surface of the composition, substantially as herein specified.

Specification signed by me this 18th day of December, 1875.

J. C. CHEATHAM.

Witnesses:
S. T. KINSER,
GEO. P. HARDY.